OR  4,050,786

United States
Feldman

[11] 4,050,786
[45] Sept. 27, 1977

[54] LIQUID CRYSTAL DISPLAY DEVICE HAVING PARTICULATE SPACERS IN LIQUID CRYSTAL AREA AND METHOD OF FABRICATION

[75] Inventor: Bernard Feldman, Goleta, Calif.

[73] Assignee: Transparent Conductors, Inc., Goleta, Calif.

[21] Appl. No.: 176,633

[22] Filed: Aug. 31, 1971

[51] Int. Cl.² .............................................. G02F 1/28
[52] U.S. Cl. ......................... 350/160 LC; 350/160 R; 350/267
[58] Field of Search ............ 350/160 LC, 160 R, 267, 350/288, 100 R

[56] References Cited

U.S. PATENT DOCUMENTS

| | | | |
|---|---|---|---|
| 3,505,804 | 4/1970 | Hofstein | 350/160 LC |
| 3,535,098 | 10/1970 | Babcock | 350/288 |
| 3,576,761 | 4/1971 | Davis | 350/160 LC |
| 3,592,526 | 7/1971 | Dreyer | 350/160 LC |
| 3,625,591 | 12/1971 | Freiser et al. | 350/160 LC |
| 3,645,604 | 2/1972 | Ngo | 350/160 LC |
| 3,647,280 | 3/1972 | Klein et al. | 350/160 LC |
| 3,661,444 | 5/1972 | Matthies | 350/160 LC |
| 3,701,368 | 10/1972 | Stern | 350/160 LC |

FOREIGN PATENT DOCUMENTS

1,138,992   1/1969   United Kingdom .......... 350/160 LC

*Primary Examiner*—Vincent P. McGraw
*Attorney, Agent, or Firm*—Harris, Kern, Wallen & Tinsley

[57] ABSTRACT

A display device wherein a liquid crystal is contained between accurately spaced transparent electrical contacts to allow control over the transparency or transmissive properties of the display by application of a voltage to the contacts. In one version the spacing is provided by an inorganic frit of particles which occupy the space between the electrical contacts and impart a ground glass optical property. The particles provide accurate separation that prevents the contacts from short circuiting and when immersed in a liquid crystal give the display an overall transparent or other characteristic as desired. Preferably, the contacts are applied to glass substrates which are hermetically sealed by fusion of a denser glass frit applied between peripheral edges of the substrates. In a further version, spacing is provided by a set of legs perpendicularly emanating from one of the electrical contacts and supporting it from the other electrical contact.

11 Claims, 27 Drawing Figures

LIQUID CRYSTAL DISPLAY DEVICE HAVING PARTICULATE SPACERS IN LIQUID CRYSTAL AREA AND METHOD OF FABRICATION

FIELD OF THE INVENTION

This invention relates to devices operating on liquid crystal principles and in particular to devices and methods of fabrication thereof wherein the liquid crystal material is contained between electrical contacts having controlled separation.

BACKGROUND OF THE INVENTION

The phenomena whereby an electro-optical material such as a liquid crystal is caused to vary its transmissivity in response to an applied electrical potential is adaptable for use in visual displays of information such as television, computer graphics, variable light transmitting shutters, etc. While display devices embodying these principles are well known, problems associated with the manufacture of such devices have limited their practicality. One such problem is the high frequency with which short circuits appear across the fluid layer, particularly when made thin to achieve lower voltage operation. Such short circuits are usually a result of an inability to control the contact spacing through the fluid layer.

Additionally, it has been found that some liquid crystals deteriorate rapidly unless hermetically sealed within the display from the environment. The requirement of a hermetic seal adds complexity in the fabrication process of prior art devices by limiting the constituent elements to inorganic compounds.

A further problem is the difficulty in providing consistency in the transmissive qualities of the liquid crystal under varying contact voltages. Since the light transmitting properties of the liquid crystal fluid depend upon the voltage gradient within the fluid, and in turn the contact spacing, to provide a consistency in transmissivity, it is important to accurately control the spacing between contacts through the fluid for uniformity. This is particularly true where the light transmitting properties depend non-linearly on the voltage gradient, and saturation is not desired. Also, an unevenness in spacing concentrates the effect of the applied voltage in regions of closest contact spacing and promotes a more rapid deterioration in the fluid in addition to the uneven optical properties.

Because of these and other problems, the manufacture of reliable, long life liquid crystal display structures has been very difficult. Particularly difficult, and yet very desirable, is the provision of a thin consistent fluid layer. This, as noted, provides in combination the advantages of increased light scattering effects at lower voltages, more uniform contrast between light transparent and light scattering segments of a display, and avoidance of uneven current densities which decrease device life.

Finally, control of the spacing between the electrical contacts is critical where one contact is a non-plane surface and the other contact is made flexible to allow it to conform to the non-plane surface. In this case, accurate spacing cannot be achieved by conventional methods.

BRIEF SUMMARY OF THE INVENTION

In exemplary preferred embodiments of the present invention a liquid crystal display is indicated for hermetically containing an electro-optic fluid, such as a nematic liquid crystal, between selectively energized electrical contacts that are regulated in spacing over large areas to provide a controlled potential gradient through the electro-optic fluid, and to eliminate short circuits.

In one preferred embodiment for the invention the electrical conductors are deposited in predetermined patterns on first and second substrates with one of the substrates, and its associated conductor, being preferably transparent. The conducting surfaces of the substrate are secured in a face to face relationship with a spacing provided by a first frit of normally non-transparent glass particles fused to one of the substrates. A denser second frit is deposited on one substrate in a pattern surrounding, but not entering, the pattern formed by the face-to-face electrical conductors and is subsequently fused together and to both substrates bonding them and providing a hermetic seal. An electro-optic fluid, such as a nematic liquid crystal, is selected with a refractive index matching that of the first frit, and is caused to flow into the region surrounding the first frit in positions bounded by the second frit. The fluid-frit boundary becomes optically invisible due to the matched indexes of refraction. Alternatively, the particles may be sparsely distributed to prevent them from impairing the electro-optic effect of the fluid without matching of refractive indexes. Application of an electric potential to contacts on opposite substrates provides an electric gradient through the fluid and glass frit spacer and creates desired variations in transparency or light transmissivity of the fluid. A very thin fluid layer is easily achieved and has the benefit of faster switching speed.

In a second embodiment of the invention the fluid chamber is formed onto a transparent substrate. The substrate, as above, has a substantially transparent electrical conductor deposited thereon in a predetermined pattern coinciding with segments of the characters and symbols which are to be displayed. During formation, an etchable substance is deposited over the substrate to a controlled depth and is subsequently patterned to allow an electrical conductor to be deposited over the coated segments with a plurality of separated, supporting legs extending to the surface of the substrate where it is not coated. Subsequent etching of the spacer material followed by a coating of the surface with an insulator leaves a sealed, elongated cavity between the patterned conductive deposition on the substrate and the multiple leg electrical conductor. The cavity is subsequently filled through formed tunnels with a liquid crystal. To accomplish display functions a potential is selectively applied between the conductive substrate coating and the legged conductor.

DESCRIPTION OF THE DRAWINGS

These and other features of the invention will be more completely presented in the following detailed description of preferred embodiments presented for purposes of illustration, and not by way of limitation, and to the accompanying drawings of which.

DETAILED DESCRIPTION OF THE PREFERRED EMBODIMENT

The phenomena whereby a liquid crystal or similar substance is caused to undergo a change in transparency, color filtration, polarization, etc. upon the application of an electric field has been long known. A general review of this phenomenon can be found in a "Scientific American" article appearing at page 100 in the April 1970 issue. Display applications are shown by U.S. Pat. Nos. 3,499,112, 3,410,999 and 3,322,485.

As mentioned above, there are problems associated with the construction of a liquid crystal display device in securing a hermetic seal and in insuring uniformity in spacing to prevent short circuits and to regulate the electric field gradient throughout the electro-optic fluid and, in turn, to provide consistent transmissivities in the display pattern over all portions.

Figure 1:
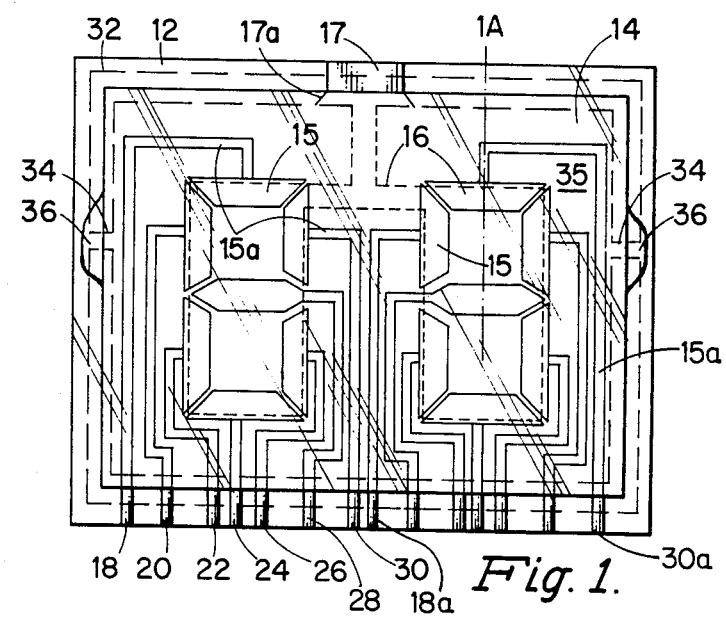
FIG. 1 is a pictorial view of a completed display unit embodying principles of the invention.

Referring now to FIG. 1, a pictorial view is provided of a completed, exemplary display unit containing features of the invention which provide for a hermetic seal and controlled spacing. The exemplified display is patterned to provide numeric information using segmented figure eight patterns, other patterns being readily achievable as desired. The completed display comprises a preferably transparent back or bottom substrate 12 and a preferably transparent top substrate 14. The inner face of the bottom substrate 12 has preferably transparent electrical conductors deposited thereon in a pattern indicated in solid lines in FIG. 1 to form segments 15 of a figure eight pattern. On the top substrate 14 an electrical conductor 16 indicated by dashed lines is deposited in a pattern substantially coextensive with the area bounded by the periphery of each figure eight pattern, but slightly smaller to provide for registration errors without activating undesired portions of the display. From each segment 15 a deposited, transparent electrical conductor 15a leads to respective even numbered contacts 18–30 and 18a–30a provided as thick film depositions on the edge of substrate 12. The substrate 14 occupies a slightly smaller area than substrate 12 so that the contacts 18–30 and 18a–30a can extend beyond the region covered by the substrate 14. The electrical conductor 16 on the substrate 14 leads to a thick film electrical contact 17 on the substrate 12 through a thick film bridge 17a between the two substrates.

A dense, fused frit seal 32, indicated by dash lines in FIG. 1, peripherally surrounds the region between the two substrates 12 and 14 and extends on both sides of the edges of the substrate 14. The frit seal 32 is preferably an inorganic substance such as glass which has been densely applied and fused together and to the two substrates 12 and 14 to provide a lateral hermetic seal for the region between the two substrates 12 and 14. Tunnels 34 are provided through the dense frit seal 32 at two locations to enable filling of region 35, bounded by the substrates 12 and 14 and seal 32, with a liquid crystal fluid.

Figure 2:
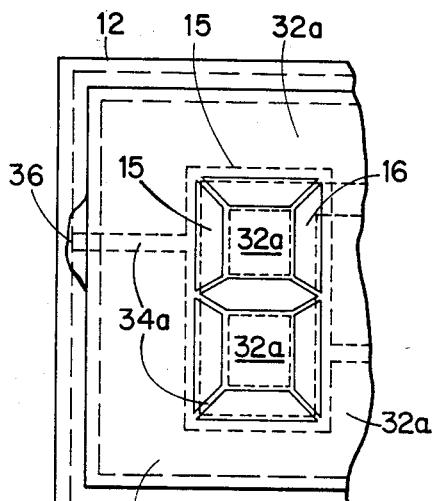
FIG. 2 illustrates pictorially an alternative to the structure of FIGS. 1, 1A and 1B.

Referring to FIG. 2, an alternative design is indicated which wherein a dense frit seal 32a, or other sealing material, covers substantially all areas between the two substrates 12 and 14 except for regions over the segments 15 and areas of tunnels 34a between the segments and between the segments and the environment.

In both embodiments of FIGS. 1 and 2, a sealant 36 closes the ends of the tunnels 34 and 34a after the region between the substrates has been filled with a liquid crystal.

Figure 1A:
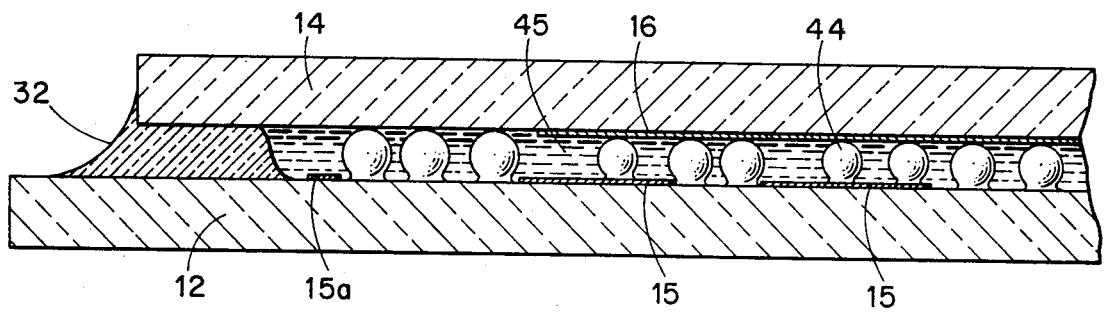
FIGS. 1A and 1B are cross-sectional and pictorial views of the display unit of FIG. 1 illustrating one structural implemention in different perspective.
Figure 1B:
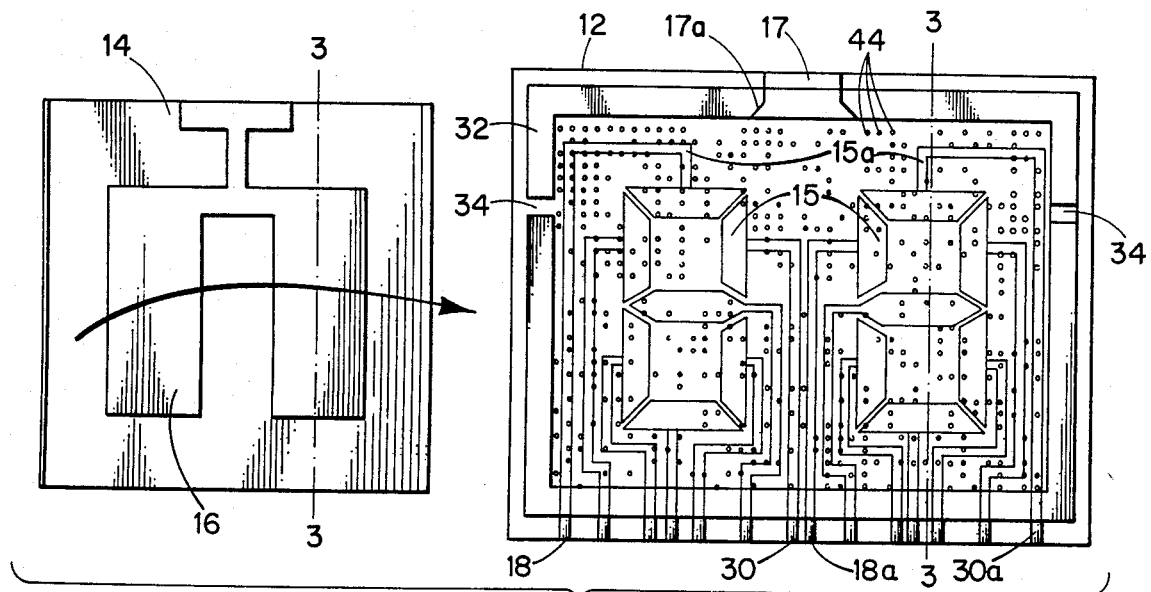

In FIGS. 1A and 1B additional views are provided of the display device of FIG. 1. In FIG. 1B the two substrates 12 and 14 are in a separated condition as they would be before being sealed together and have their inner faces oriented toward the viewer. Arrows indicate the manner in which they would be brought together into proper registration for sealing. Substrate 14 is shown slightly inclined to the plane of the page as though it were being folded over for sealing to substrate 12. On the substrate 14 the electrically conductive and transparent coating 16 is indicated as having an area which will cause it to be coextensive with all but the fringes of the region of the figure eight pattern 15 without covering the leads 15a. The substrate 12 is shown having the segments 15 and the leads 15a to the external electrical contacts 18 through 30 and 18a through 30a on the edge of the substrate 12 and the frit seal 32, with tunnels 34, is indicated in its surrounding relationship. In addition, frit particles 44 are shown randomly distributed over the surface of the substrate 12 preferably within the region bounded by the denser frit seal 32. The frit particles 44 are best illustrated in FIG. 1A which presents a sectional view along the lines 1A—1A indicated in FIG. 1. The frit particles 44, fused to the substrate 12, provide a spacing function for controlled separation of the two substrates 12 and 14. While indicated as glass balls here, the particles 44 may be beads or irregular shapes having typical diameters in the range of 5 to 25 microns, other sizes being possible as desired, but with thinner fluid layers appearing to have an advantage of faster switching speed.

The denser fused frit 32 is indicated as laterally and hermetically containing a liquid crystal fluid 45, sandwiched between the substrates 12 and 14. The frit seal 32 is shown here as providing a partial fillet between the substrates, wetting slightly the verticle edge of the substrate 14. A more complete fillet may be used, or no fillet at all.

Alternatively, to tunnels 34 through seal 32, holes may be provided in substrates 12 or 14 for filling with the liquid crystal fluid. The holes are subsequently plugged.

The frit particles 44 illustrated in FIGS. 1A and 1B may have a well defined upper limit to the distribution of their sizes so as to provide numerous pillars of similar height that support and separate the two substrates 12 and 14. Numerous smaller particles fused to the larger particles or the substrates themselves may be present.

Where the liquid crystal fluid depends for its electrooptic properties on direct contact with the electrically conductive coatings 15 and 16, the interstices between the substrates 12 and 14 and surrounding the frit particles 44 must communicate with these coatings 15 and 16 to a substantial degree. If only an electrostatic field is required to induce the electro-optic effect, then contact is not necessary.

As indicated in FIG. 1B, the frit particles 44 give a frosted or ground glass appearance to the portions of substrate 12 where they are applied and fused. With the finished structure indicated in FIG. 1A and with the liquid crystal 45 surrounding the particles 44 in the region between the substrates 12 and 14, the frosted or ground glass appearance is eliminated by matched indices of refraction between the frit particles 44 and the fluid 45. Frits and liquid crystals come in various refractive indices making it possible to accomplish this purpose. A Corning 400 Mesh frit No. 7570 with a nematic liquid crystal is an exemplary combination.

With selective application of electric potential between the segments 15 and conductor 16, desired segments 15 of the figure eight pattern are made to scatter light rather than transmit it. The desired activated segments are made visible by back or side lighting of the display of FIG. 1. By inverting the display and causing the electrical conductor 16 to be reflective a visible display is provided with the use of front illumination.

It is to be noted that many variations are possible in the above structure. Already noted is the possibility of a reflection mode of operation utilizing a reflective conductor. Also, the substrates 12 and 14, conductive coatings 15 and 16, particles 44, fluid 45, or seal 32 may be colored or given polarization as desired. Fluid 45 may change color or vary other properties such as polarization in response to electrical stimulation.

As another alternative, a sparser application of frit particles 44 achieves a satisfactory spacing function without substantially impairing the optical properties of the fluid even if the indices of refraction are not matched.

Further alternative structures, based on the above spacing concept, can be produced and are illustrated in FIGS. 1C-1G. In these drawings, the particles are applied and fused to substrate 14, rather than substrate 12, either approach being possible.

Figure 1C:
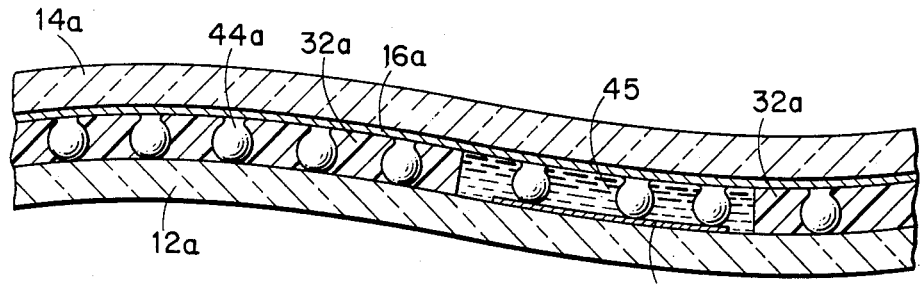
FIGS. 1C–1G illustrate variations of FIGS. 1, 1A and 1B.

Referring now to FIG. 1C, an embodiment is shown wherein substrates 12a and 14a are contoured rather than plane. In practice, one substrate such as 14a will be rigid and formed with the desired shape. The other substrate 12a is flexible and preferably has the generally desired shape of the substrate 14a but requiring pressure at the periphery to produce conformity. This allows the substrate 12a to conform to the envelope of frit particles 44a by the application of pressure to the two substrates forcing them together, before setting of sealant 32a. In other respects the structure is substantially the same as indicated in FIGS. 1A and 1B and as modified in FIG. 2.

The described system of support pillars separating the two substrates in FIG. 1C is particularly useful in this case of contoured substrates where one of the substrates is at least partially flexible. The frit particles 44a, fused to the substrate 14a, provide accurate and controlled spacing between the substrates over substantial areas which may encompass many square inches of substrate. Without the pillar system of separation there would be no way to rigidly hold the flexible substrate in proper relationship to the fixed substrate.

An important application for the device of FIG. 1C is in optical lenses or overlays. Optical distortions are controlled by matching the indices of refraction of the fluid 45 and sealant 32a to the frit particles 44a.

Figure 1D:
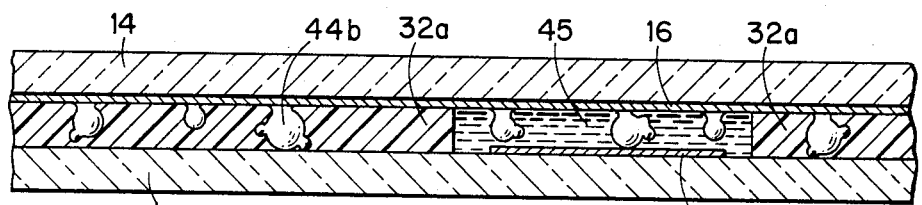
Figure 1E:
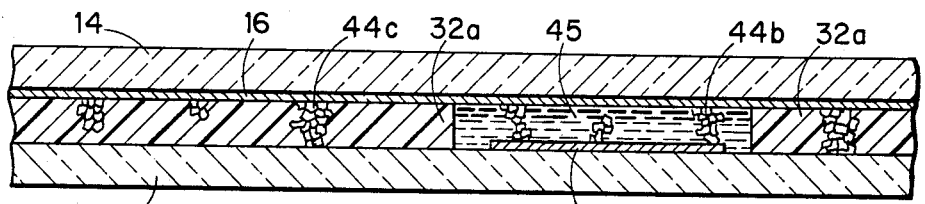
Figure 1F:
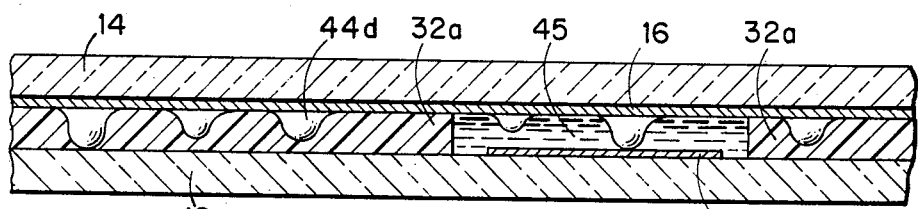
Figure 1G:
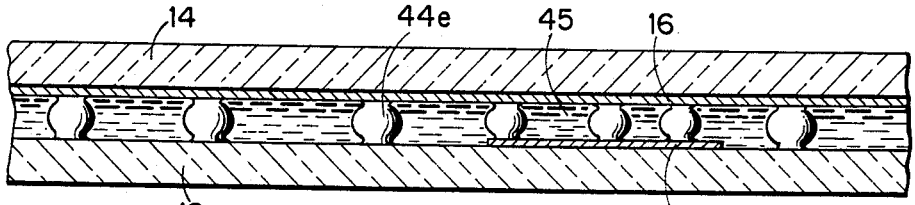

Referring now to FIG. 1D, a further type of frit particle 44b is indicated wherein the particles, while less uniform in size, are fused together and to the substrate 14 to provide the support pillars which have a relatively uniform envelope for spacing of the two substrates. In FIG. 1E frit particles 44c are not only of random size but of random shape illustrating one of the more commonly available frit types. The frit particles 44c are fused together during processing steps to be described below, and result in support pillars for the two substrates of substantially uniform height. In FIG. 1F frit particles 44d assume a final, substantially hemispheric shape due to the combined effect of higher fusion heat and surface tension during a fusion step, described below, in the process of manufacture. In FIG. 1G a further exemplary form of frit particle is indicated by particles 44e. Here, the frit particles have been fused to both the substrates 12 and 14 and slightly deformed by the application of heat and pressure on the substrates. In this structure there is a bond between both of the substrates produced by the pillars themselves rather than by a sealant. This structure makes possible very large area displays wherein substantially all of the display, except the peripheral edges, has a liquid crystal fluid between the substrates in the interstices left by the deformed frit particles 44e. The pressure which results in the deforming of the particles also helps to provide contact with more particles and consequently increase the support function and strength of the pillar system.

In the structure indicated by FIGS. 1C-1G, the frit particles are generally of more irregular shape which increases the ground glass appearance of the display in the absence of the liquid crystal fluid in the interstices between the substrates and surrounding the frit particles. This increased ground glass appearance, however, substantially or entirely disappears in the presence of the fluid or sealant as indicated above. FIGS. 1C-1F have indicated embodiments of the invention utilizing the modification of FIG. 2 wherein sealant 32a occupies most of the area between the substrates. It is possible instead to use the form of FIG. 1 as desired by the user.

Other modifications are possible including different combinations of structures indicated above.

Because of the relative ease with which frit particles of regular or irregular diameters can be produced commercially, the use of such particles as separators for the conductors of a liquid crystal display device provides a simple and inexpensive mechanism for achieving transparency and controlled spacing over large areas without short circuits and for achieving a hermetic seal in the completed display. The steps in the manufacture of such a device are more clearly indicated by reference to FIGS. 3A-3E.

Figure 3A:
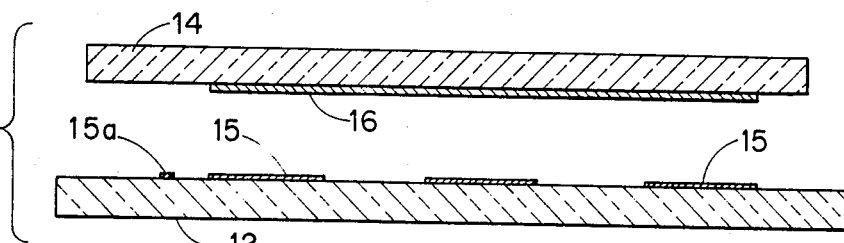
FIGS. 3A–3E illustrate steps in the processing of the device illustrated in FIGS. 1, 1A and 1B.

In FIG. 3A top and bottom substrates 14 and 12 are indicated as having been coated with electrically conductive depositions 16 and 15 respectively. Preferably, but not necessarily, both substrates 12 and 14 and coatings 15 and 16 are substantially transparent. Coating 16 may be a non-transparent epoxy silver cement, for example, where transparency is not necessary there.

The manufacture of the coated substrates with the coating 16 and patterned configuration 15 may be produced by any of several procedures. Preferably glass blanks are initially purchased with a commonly available tin oxide coating and subsequently etched to provide the desired pattern of coatings 15 and 16.

Figure 3B:
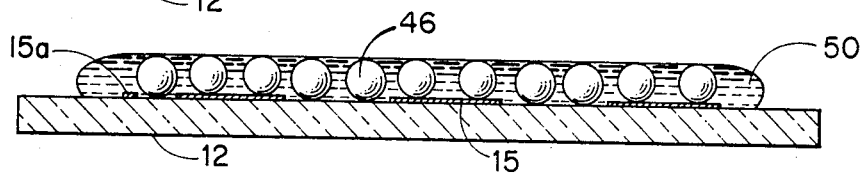

Subsequently, and as indicated in FIG. 3B, a glass frit 46 dispersed in a thixotropic medium 50 such as ethyl cellulose is applied by silk screening, spraying or roller coating onto the conductive surface 16 leaving a layer of the glass particles 46 suspended in medium 50. 400 Mesh Corning frit No. 7570 may be used.

Figure 3C:
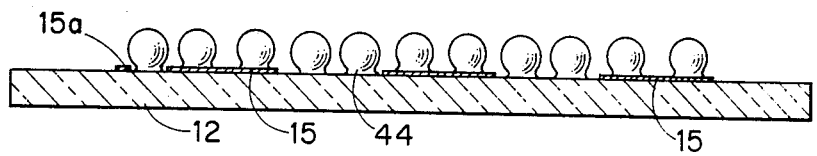

Subsequently, and as indicated in FIG. 3C, the substrate 12 is fired to remove the thixotropic medium 50 and fuse the frit to the coating 16, leaving the fused particles 44.

Figure 3D:
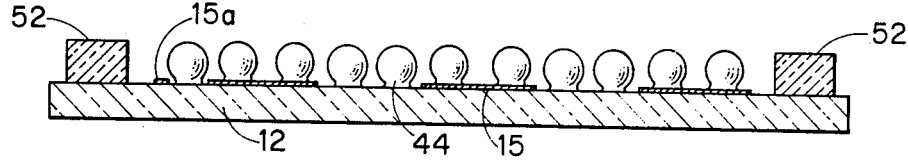

Referring now to FIG. 3D a dense frit 52 is peripherally applied to the substrate 12. The frit particles in the frit 52 are designed to fuse at a lower temperature than the particles 44 so that, as indicated, in FIG. 3E, when the substrates 14 and 12 are forced together in face to face relationship, at an elevated temperature of fusion, and in registration, the frit 52 will fuse and form seal 32 without permitting the particles 44 to substantially deform. Alternatively, though not as convenient, it is possible to apply the heat to the periphery of the display so that only the frit 52 is heated to fusion during the step of FIG. 3E.

Figure 3E:
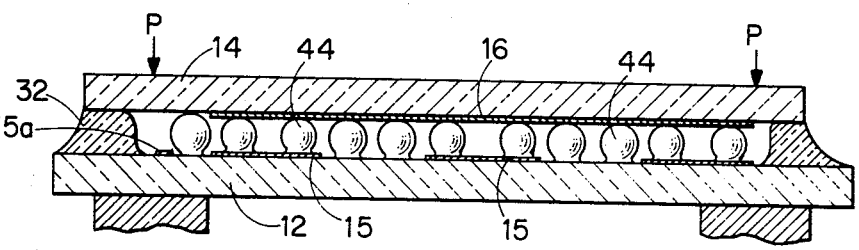

When the frit 52 is applied to the substrate 12 in FIGS. 3D, tunnels 34 are provided at predetermined locations as indicated in FIG. 1 such that the device resulting from the processing in FIG. 3E may be filled with a liquid crystal fluid to result in the structure of FIGS. 1 and 1A. The filling step which results in the final display structure of FIG. 1 is preferably achieved by supplying liquid crystal to one tunnel 34 while evacuating at the other tunnel to prevent air bubbles.

It should at this point be pointed out that the thickness of the conductive coatings for segments 15 and 16 has been exagerated in the drawings for purposes of illustration and that in actual practice their thickness is of negligible magnitude compared to the diameter of the particles 44 and spacings between the substrates.

While it is preferable to use a glass for the frit seal 32 in FIG. 1 of frit seal 32a in FIG. 2, other types of adhesive may be employed. Solder or fired ceramics may be used as alternatives and if a hermetic seal is not necessary an epoxy adhesive may be employed.

Because of the close tolerances and proximate placement of the components, it is desirable to avoid gross mismatches in coefficients of thermal expansion in the rigid components where such mismatches would create excessive stress and strains within the display.

Some modifications in the procedures indicated in FIGS. 3A-3F are required in arriving at the respective structures illustrated in FIGS. 1C-1G. To produce the structure of FIG. 1C, sufficient pressure is applied in the steps of FIG. 3E to conform the two substrates to the envelope of the frit particles. Fabrication of the devices of FIGS. 1E-1F follows substantially the same procedure but use a different natuer of frit particle as indicated above. To achieve the unit of FIG. 1E, the frit and medium are applied to an accurate thickness with a sufficiently dense frit to fuse into pillars. In FIG. 1F, additional heat is preferably employed in converting the structure of FIG. 3B to the structure of FIG. 3C so as to fuse the frit particles into hemispheric pillars. In producing all the structures except that of FIG. 1G, the frit 52 is applied to all regions except the area of the display segments. For the device of FIG. 1G, when the two substrates are brought together in registration, heat and pressure are applied so as to fuse the frit particles 44d to both substrates and to deform them slightly. Differences in the heat of fusion between frit 52 and particles 44d may be less than in previous units to produce fusion by both particles 44d and frit 52 simultaneously. Here, one substrate may be flexible to facilitate the production of large area displays.

Figure 4A:
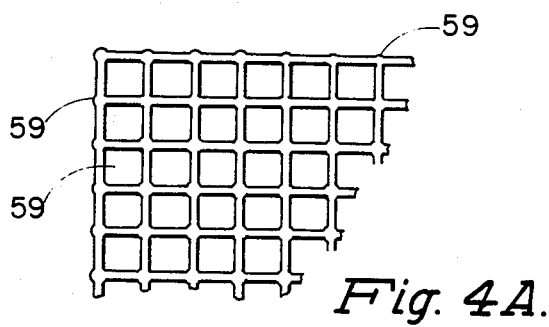
FIGS. 4A and 4B illustrate an alternative spacer for the structure of FIGS. 1, 1A and 1B.
Figure 4B:
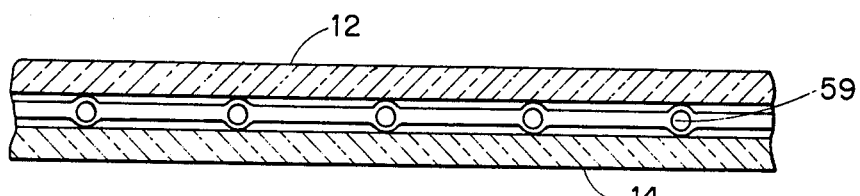

As an alternative to the use of a frit of glass particles, it is possible to substitute other substances which can be made transparent when immersed in a liquid crystal. In FIGS. 4A and 4B an example of a different spacing material is indicated. FIG. 4A shows a mesh of glass fibers 59 which can be used in place of the particles 44 of FIGS. 1A and 1B. The processing and end result is similar to that indicated above but the final result, as shown in FIG. 4B, has, rather than glass particles, a glass mesh of fibers 59 sandwiched between substrates 12 and 14.

Figure 5A:
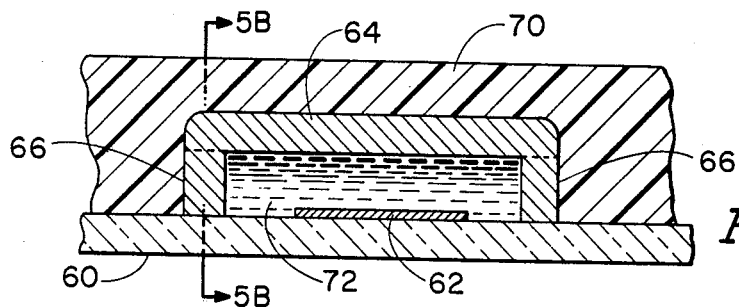
FIGS. 5A and 5B indicate in cross-section an alternative structure embodying the invention.
Figure 5B:
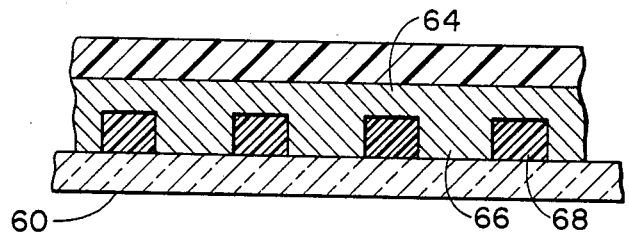

An alternative structure for providing a consistent spacing through a liquid crystal layer between electrical conductors is indicated in FIGS. 5A and 5B. In FIG. 5A a substrate 60 of a transparent material such as glass has a transparent electrical conductor 62 provided thereon in a predetermined pattern which forms the segments to be selectively activated for display purposes. It is achieved in a manner analogous to the coating 15 in FIGS. 1A and 1B. Surrounding the conductive coating 62 is an electrical conductor 64 which is normally not transparent. It is supported away from the substrate 60 by a plurality of legs 66. The legs 66 are better shown in a sectional view by FIG. 5B which is viewed along the section lines 5B—5B indicated in FIG. 5A. The legs 66 are separated by openings 68.

An electrically insulating material 70 is deposited on the substrate 60 and surrounds the electrically conducting material 64 and penetrates at least partly into the spaces 68 between the legs 66. There results a cavity between the conductors 64 and 62 which in a completed display follows the pattern indicated by the segments 15 and tunnels 34 in FIG. 2. A liquid crystal fluid 72 is forced into the tunnels to fill the cavities between the conductors 62 and 64. As in FIG. 1, electrical contacts are provided from the coated conductor 62 to points external of the display. The cavities formed by conductor 64 are preferably continuous with an external contact to apply an electrical potential, or contact may be through a conductive coating on substrate 60 contacting one or more legs 66.

Figure 6A:
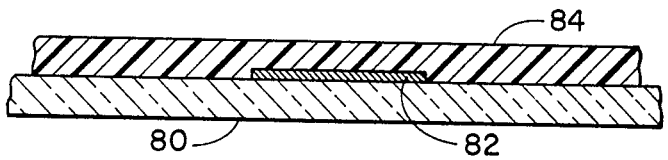
FIGS. 6A–6E indicate stages of the processing of the device of FIGS. 5A and 5B.

Accurate and consistent control of the spacing between the conductors 62 and 64 through the fluid 72 is provided by the process of manufacture indicated in FIGS. 6A-6E. In FIG. 6A, an electrically conductive coating 82 has been formed on a substrate 80 in a predetermined pattern. Also an etchable substance 84 such as electroless copper or nickel has been deposited to an accurately controlled thickness over the surface of the substrate 80 containing the conductor 82. Uniformity of deposition can be achieved in an electroless bath using well known techniques which allow uniformity to be achieved by accurate control of temperature. Thicknesses of less than a one thousandth of an inch can be achieved.

Figure 6B:
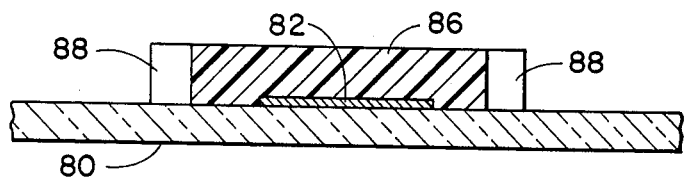

Referring to FIG. 6B, the substrate 80 and etchable material 84 are shown after an etch has removed all the material 84 except for a portion 86 completely covering the electrode 82 and extending therebeyond a predetermined distance to compensate for registration tolerances and fringe fields. The removal of material 84 also leaves fingers 88 in places where ultimately the spacings 68 between the legs 66 will exist. Removal can be by an appropriate one of the well known etching and resist techniques.

Figure 6C:
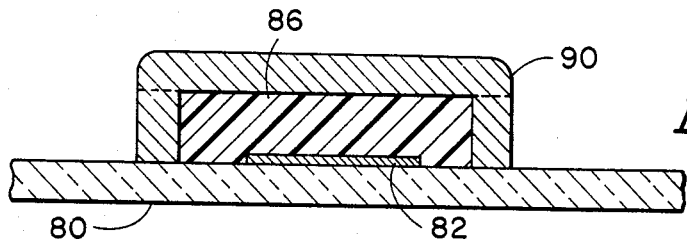

Referring to FIG. 6C, an opaque conductor material 90, such as a conductive frit, has been deposited around the remaining portion 86 of the spacer material 84 by, for example, a silk screen and firing process. The conductor 90 is silk screened in a pattern which allows the conductive material to fill in between the fingers 88 to form the legs 66 in FIG. 5B. Alternatively the pattern of conductor 90 can be achieved by etching a uniform conductive coating.

Figure 6D:
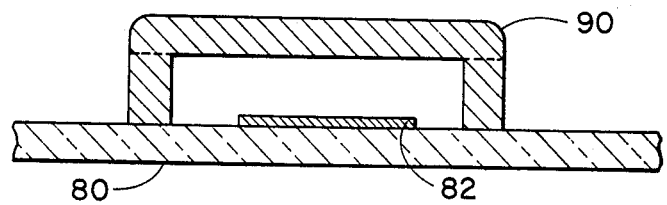

Subsequently, and as shown in FIG. 6D, the remaining portions of the spacer material 86 and fingers 88 are etched out using preferably an ultrasonic etching technique. The material forming the conductor 90 and conductor 82 must be impervious to etching techniques useful in removing the remaining portion 86 of material 84. The space between the legs of the conductor 90 facilitates the removal of the material under the conductor during etching.

Figure 6E:
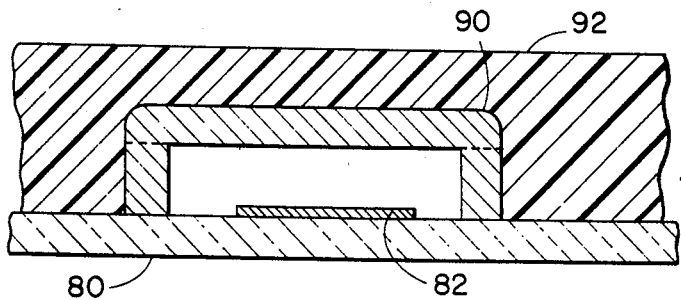

In FIG. 6E, an insulating and hermetically sealing material 92 has been applied over the substrate 80, for example, by silk screen and firing techniques. The optical properties of the insulator 92 can range from clear to opaque as desired. Finally, by filling the cavities between the conductors 82 and 90 through external access with a liquid crystal, the unit indicated in FIGS. 5A and 5B is achieved.

As a modification, it is possible to eliminate the ultrasonic etching and filling steps by using an electro-optic solid for the material 86. Since no etching of material 86 is necessary, legs 66 need not be separated by openings 68 to facilitate etching.

Accurate spacing of the conductors 64 and 62 in FIGS. 5A and 5B is insured by the controlled thickness to which the material 84 is deposited. This spacing is then maintained by the legs 66 which rigidly and securely position the conductor 64 relative to the conductive coating 62.

Because of the juxtaposition of a number of different substances, it is necessary to control the coefficients of thermal expansion to prevent the generation of stress within the structure of FIGS. 5A and 5B and FIGS. 6A-6E during processing. In particular, attention must be paid to matching the thermal coefficients of the insulating material 70, the substrate 60, and the conductor 64, and to keeping the coefficient of the material 84 higher than that for conductor 64.

Alternative designs may be accomplished by, for example, placing the legs 66 intermediate of the conductor 64 rather than at its edges. In such a case the conductive pattern 62 is removed at locations where the legs are to ultimately contact the substrate 60. While the presence of supporting legs in the middle of the selectively darkened segment may be noticeable, the overall effect can be negligible in the operation of the display.

Figure 7:
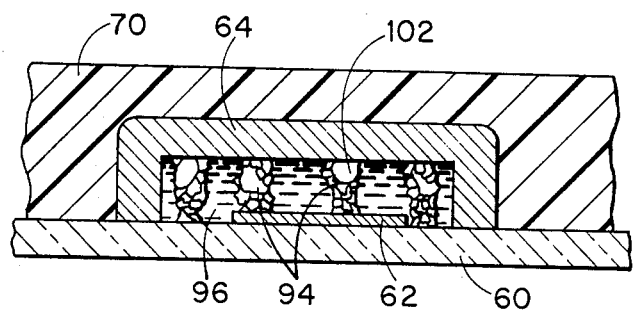
FIG. 7 is an alternative form for the structure of FIGS. 5A and 5B.

The total structure of FIGS. 5A and 5B and 6A-6F, can be combined with the frit particle support concept of the earlier figures to result in a structure of the type indicated in FIG. 7 and FIGS. 8A-8C. In FIG. 7 the substrate 60 and patterned conductive coating 62 is provided as before in FIG. 5A. Also, the conductor 64, formed as the legged conductor, and the insulating coating 70 are provided. Between the two conductors 62 and 64, however, a plurality of fused frit particles 94 provide pillars of support for the conductor 64 from the substrate 60. A liquid crystal 96 is caused to flow between the two conductors 62 and 64, and around the fused frit particles 94 as in the case of the structure of FIGS. 1A and 1B.

Figure 8A:
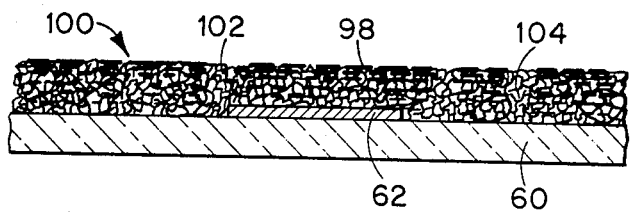
FIGS. 8A–8C indicate processing modifications for achieving the structure of FIG. 7.
Figure 8B:
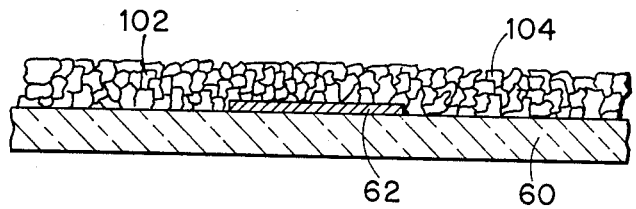
Figure 8C:
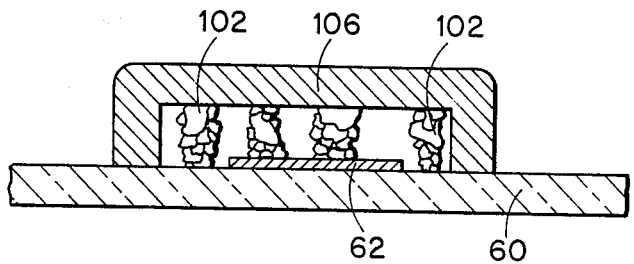

Differences in the process of manufacture which result in the structure of FIG. 7 from the process indicated in FIGS. 6A-6E are shown in FIGS. 8A-8C. In FIG. 8A the substrate 60 with the patterned conductor 62 thereon is coated, typically by a silk screen or other process, with a substance 98 to an accurately controlled depth. The substance 98 includes a medium 100 and two different types of frit particles 102 and 104, intermixed in random distribution. Subsequently, and as indicated in FIG. 8B, the medium is evaporated and the frit particles fused together during a firing step. The result is, preferably, a solid film of fused frit, such as glass, with the solid film composed of lumps of alternating frit types 102 and 104. The steps indicated in reference to FIGS. 6B and 6C are subsequently followed to result in the production of a legged conductor 106 around the fused frit composed of particles 102 and 104.

One of the frit types, in this case particle 104, is etchable by an acid solution whereas the type 102 is not etchable. Etching with such an acid solution washes all of the particle types 104 leaving only fused frit particles 102 between the conductor 106 and conductive pattern 62. The resulting interstices are subsequently filled with the liquid crystal as indicated above to result in the structure shown in FIG. 7. It should be understood that the arrangement of particles and pillars shown may appear more regular in the drawings for illustration purposes than will be found in the individual display.

The dual frit process indicated in FIGS. 8A-8C may be applied to producing the device of FIG. 1 or FIG. 1B by adding the steps of that process into the steps of FIGS. 3A-3E.

Also, while the specific examples indicated above have generally portrayed equally spaced substrates, embodiments are contemplated wherein the pillars described above are used to maintain a predetermined variation in spacing which creates electro-optic effects varying in area or extent with variations in applied signals.

Finally, while the disclosure has related to matching refractive indexes of frit and fluid, the frit can be applied in limited or complete patterns to remain constantly perceptible through refractive mismatching or tinting, thereby to create, for example, an overlay design. In such case, and with reference to FIGS. 1A and 1B, the liquid 45 and particles 46 may be deliberately mismatched, or the particles or liquid tinted, giving enough perceptibility for the user to have an idea of the type of characters which can be displayed.

Having indicated above preferred embodiments of the described invention, it will occur to those skilled in the art that various modifications and alterations can be made to the disclosed apparatus and methods without departing from the spirit of the invention. Different combinations of the above indicated components can also be employed. It is accordingly intended to limit the scope of the invention only as indicated in the following claims.

What is claimed is:

1. A display for containing electro-optic material in a layer of controlled thinness comprising:
   first and second substrates;
   a pattern of electrical conductors associated with each of said first and second substrates;
   said first and second substrates being positioned to define a predetermined separation therebetween and having:

a plurality of support particles in the region between said first and second substrates;

said plurality of support particles being in generally isolated distribution throughout a substantial portion of the region between said first and second substrates including regions intermediate the peripheries of said first and second substrates;

said plurality of support particles being bonded to each of said substrates to provide a rigid physical interconnection between said first and second substrates;

said support particles thereby defining the predetermined separation between said substrates; and an electro-optic material in the region between said first and second substrates.

2. The display of claim 1 wherein the bonded particles are fused to said first and second substrates.

3. The display of claim 2 wherein said support particles comprise frit particles having a softening point below the distortion point of the first and second substrates and being generally matched in coefficient of thermal expansion to said substrates.

4. The display of claim 1 wherein said conductors associated with said first and second substrates include a generally conductive portion applied to said first substrate and a plurality of patterned conductive portions applied to the surface of said second substrate, the surfaces of said first and second substrates which have said applied conductors being in facing relationship in said display to contact said electro-optic material.

5. The display of claim 2 wherein:

each of said first and second substrates are curved and transparent;

one of said first and second substrates is substantially more flexible than the other of said first and second substrates; and the first and second substrates are bonded to said support particles in a condition of stress.

6. The display of claim 2 further including first and second material types in said support particles between said first and second substrates, said first and second material types having significantly different, respective fusing temperatures, with said second material having a lower fusing temperature and providing a peripheral hermetic seal.

7. The display of claim 1 wherein the bonded support particles include fused particles of substantially lower diameters than the separation of said first and second substrates along with a plurality of larger diameter particles having a generally maximum size in the diameter thereof generally matching the separation of said substrates and with a substantial number of particles of that generally maximum size.

8. The display of claim 1 wherein said electro-optic material includes a liquid crystal.

9. The display of claim 1 wherein said support particles include particles of a plurality of frit types.

10. The display of claim 9 wherein said particles of plural frit types include particles in different states of fusion.

11. A display for containing electro-optic material in a layer of controlled thinness comprising:

first and second substrates;

a pattern of electrical conductors associated with each of said first and second substrates;

said first and second substrates being positioned to define a predetermined separation therebetween and having:

a plurality of first heat softenable support particles in the region between said first and second substrates;

said plurality of first heat softenable support particles being in generally isolated distribution throughout a substantial portion of the region between said first and second substrates including the regions intermediate the peripheries of said first and second substrates;

said first heat softenable support particles thereby defining the predetermined separation between said substrates;

a plurality of second heat softenable support particles of lower firing temperature than said plurality of first heat softenable support particles and forming a seal for said first and second substrates peripheral of the region containing said first heat softenable support particles; and an electro-optic material in the region between said first and second substrates.

* * * * *